United States Patent
Kassai et al.

(10) Patent No.: US 6,908,100 B2
(45) Date of Patent: Jun. 21, 2005

(54) CHILD-CARE INSTRUMENT

(75) Inventors: Kenzou Kassai, Osaka (JP); Hiroyasu Yamamoto, Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 86 days.

(21) Appl. No.: 10/424,468

(22) Filed: Apr. 28, 2003

(65) Prior Publication Data

US 2003/0227158 A1 Dec. 11, 2003

(30) Foreign Application Priority Data

Jun. 5, 2002 (JP) .......................................... 2002-164451
Feb. 21, 2003 (JP) .......................................... 2003-044203

(51) Int. Cl.[7] ................................................ B62B 7/00
(52) U.S. Cl. ........................ 280/642; 280/643; 280/644; 280/650
(58) Field of Search .................................. 280/642, 644, 280/647, 650, 658, 47.4, 643; 297/354.12, 354.13, 380, 377, 382, 25, 34

(56) References Cited

U.S. PATENT DOCUMENTS

| 2,751,232 | A | * | 6/1956 | Sundberg ..................... 280/644 |
| 3,424,493 | A | * | 1/1969 | Berger et al. ................ 297/464 |
| 4,132,429 | A | * | 1/1979 | Woods ........................ 280/647 |
| 4,345,777 | A | * | 8/1982 | Perego ....................... 280/647 |
| 4,426,113 | A | * | 1/1984 | Schutz .................. 297/440.11 |
| 4,618,184 | A | * | 10/1986 | Harvey ........................ 297/19 |
| 4,741,551 | A | * | 5/1988 | Perego ....................... 280/642 |
| 4,930,697 | A | * | 6/1990 | Takahashi et al. ........... 224/275 |
| 4,945,587 | A | * | 8/1990 | Ferro ............................ 5/419 |
| 5,087,066 | A | * | 2/1992 | Mong-Hsing ................ 280/644 |
| 5,195,770 | A | * | 3/1993 | Ishikura ...................... 280/648 |
| 5,490,685 | A | * | 2/1996 | Kitayama et al. ......... 280/47.38 |
| 5,590,896 | A | * | 1/1997 | Eichhorn .................... 280/642 |
| 5,662,380 | A | * | 9/1997 | Tam et al. .............. 297/354.12 |
| 5,738,410 | A | * | 4/1998 | Stroud et al. ........... 297/354.12 |
| 5,752,738 | A | * | 5/1998 | Onishi et al. ................. 297/61 |
| 5,954,404 | A | * | 9/1999 | Suzuki ....................... 297/467 |
| 6,702,316 | B2 | * | 3/2004 | Hsia .......................... 280/648 |

FOREIGN PATENT DOCUMENTS

JP          7-4248          1/1995

* cited by examiner

Primary Examiner—Lesley D. Morris
Assistant Examiner—Kelly E Campbell
(74) Attorney, Agent, or Firm—W. F. Fasse; W. G. Fasse

(57) ABSTRACT

A baby carriage comprises a body frame including a pair of longitudinal side frame members, a seat hammock including a backrest sheet portion, a backside support, and an upper end connecting member. The backside support includes backside string members extending so as to support the backrest sheet portion from the back side such that it can be reclined. The upper end connecting member comprises an upper end string member extending along the whole width of the backrest sheet portion at the upper end in a width direction and having both ends connected to the pair of longitudinal side frame members. A length of the upper end connecting member is selected such that it is in an unloaded loose state until a reclined angle of the backrest sheet portion reaches a predetermined value and it is in a loaded tense state while the reclined angle of the backrest sheet portion ranges from the predetermined value to the maximum reclined angle to prohibit backward movement of the upper end portion of the backrest sheet portion.

9 Claims, 14 Drawing Sheets

CHILD-CARE INSTRUMENT

BACKGROUND OF THE INVENTION

1. Field of the Invention

The present invention relates to a child-care instrument provided with a seat, and more particularly, it relates to a child-care instrument in which a backrest portion can be reclined.

2. Description of the Background Art

As a child-care instrument provided with a seat in which a backrest portion can be reclined, a baby carriage, a child seat, a child car seat, a baby bed/chair or the like is well known. Hereinafter, description will be made of a baby carriage as a typical example of the child-care instrument.

Japanese Utility Model Laying-Open Gazette No. 7-4248 discloses a lightweight-type baby carriage in which a hammock is provided on a body frame. A backrest portion of the hammock is supported by a belt member from the backside thereof and a reclined angle of the backrest portion can be changed by adjusting a length of the belt. This kind of baby carriage can be made lightweight by making a reclining structure of the backrest portion very simple.

A baby carriage is generally provided with a crotch belt and a waist belt for restraining a baby on a seat. These belts prevent the baby from failing out of the seat in forward and sideward directions.

In a case of the lightweight-type baby carriage disclosed in Japanese Utility Model Laying-Open Gazette No. 7-4248, an upper portion of a seat, that is, an upper portion of the backrest portion of the hammock is opened. Although the crotch belt and the waist belt are effective in preventing the baby from falling out forward and sideward, it is not so effective in preventing the baby from falling out upward.

Especially, in a baby carriage which can take a form of a bed state by largely reclining a backrest portion, it is an anxious matter that the baby falls out upward in the bed state (falling head down by moving upwardly along the backrest portion).

It is said that a brain of a baby is developed most well from seven months old in the womb to three years old. Therefore, it is very important to protect a baby's head in the child-care instrument for holding especially a baby.

SUMMARY OF THE INVENTION

It is an object of the present invention to provide a child-care instrument in which protection of a baby's head is mainly focused on.

A child-care instrument according to the present invention comprises a body frame, a seat hammock, a backside support, and an upper end connecting member. The body frame includes a seating surface support member and a pair of longitudinal side frame members upwardly extending from both sides at the rear end region of the seating surface support member. The seat hammock includes a seating surface sheet portion extending on the seating surface support member and a backrest sheet portion connected to a rear edge of the seating surface sheet portion and extending between the pair of longitudinal side frame members. The backside support is connected to the body frame to support the backrest sheet portion from the backside such that it can be reclined. The upper end connecting member connects the upper end of the backrest sheet portion to the pair of longitudinal side frame members. A length of the upper end connecting member is selected such that the upper end of the backrest sheet portion in a reclined state is raised.

According to the child-care instrument having the above structure, when the backrest sheet portion is in a backwardly reclined state, an upper end region of the backrest sheet portion is raised from a remaining backrest sheet portion to cover a top of a baby's head.

According to a preferable embodiment of the present invention, a length of the upper end connecting member is selected such that it is in an unloaded loose state until a reclined angle of the backrest sheet portion reaches a predetermined value, and it is in a loaded tense state to prohibit backward movement of the upper end of the backrest sheet portion while the reclined angle of the backrest sheet portion ranges from the predetermined value to the maximum reclined angle. According to the above structure, the whole of the backrest sheet portion is reclined in a body until the backrest sheet portion is reclined in a position of the predetermined angle. Meanwhile, when the reclined angle of the backrest sheet portion reaches the predetermined value, the upper end of the backrest sheet portion becomes in a tense state to be fixed in the position. Therefore, if the backrest sheet portion is further reclined over the predetermined angle, the upper end region of the backrest sheet portion is bent from the remaining backrest sheet portion so as to have a configuration to cover the top of the baby's head.

If the child-care instrument can take a form of a chair state and a form of a bed state, a length of the upper end connecting member is preferably selected so as to raise the upper end of the backrest sheet portion in the form of the bed state.

The upper end connecting member preferably comprises an upper end string member extending along the whole length of the backrest sheet portion at an upper end in the width direction and having both ends connected to the pair of longitudinal side frame members. Thus, the upper end region of the backrest sheet portion can be bent by a very simple mechanism.

The upper end connecting member may be formed of a cloth material constituting the seat hammock. Alternatively, the upper end connecting member may be formed of a reinforced upper edge of the seat hammock.

The backside support preferably comprises a backside string member extending along the whole length of the backrest sheet portion on the back side in the width direction and having both ends connected to the pair of longitudinal side frame members. Thus, since the reclining mechanism of the backrest portion can be very simple, the child-care instrument can be lightened.

The backrest sheet portion preferably comprises a head part core material positioned at its upper end region and a back surface core material connected to a lower end of the head part core material so as to be able to be bent relative thereto. The head part core material and the back surface core material are in a bent state while a reclined angle of the backrest sheet portion ranges from a predetermined value to the maximum reclined angle. Since the bead part core material and the back surface core material are provided, a stable bent configuration can be provided. The head part core material and the back surface core material preferably are a sheet of a contiguous fiat plate having cuts formed in its backside and serving as bending points for both materials.

The hammock preferably comprises a pair of side surface sheet portions rising from both side edges of the backrest sheet portion and frontwardly extending. Each side surface sheet portion includes a protection pad at a position corresponding to a height of a baby's head when a baby is seated. Thus, the baby's head can be protected from an impact from the side.

The child-care instrument typically is a baby carriage which can take a form of a chair state and a form of a bed state. The pair of side surface sheet portions frontwardly extends beyond the pair of longitudinal side frame members in the form of the chair state, and the pair of side surface sheet portions is positioned behind the pair of longitudinal side frame members in the form of the bed state. According to the above structure, the baby's head can be protected from the impact from the side in both forms of chair and bed states.

DETAILED DESCRIPTION OF THE PREFERRED EMBODIMENTS

Hereinafter, an embodiment of the present invention will be described with reference to the accompanying drawings.

Figure 1:
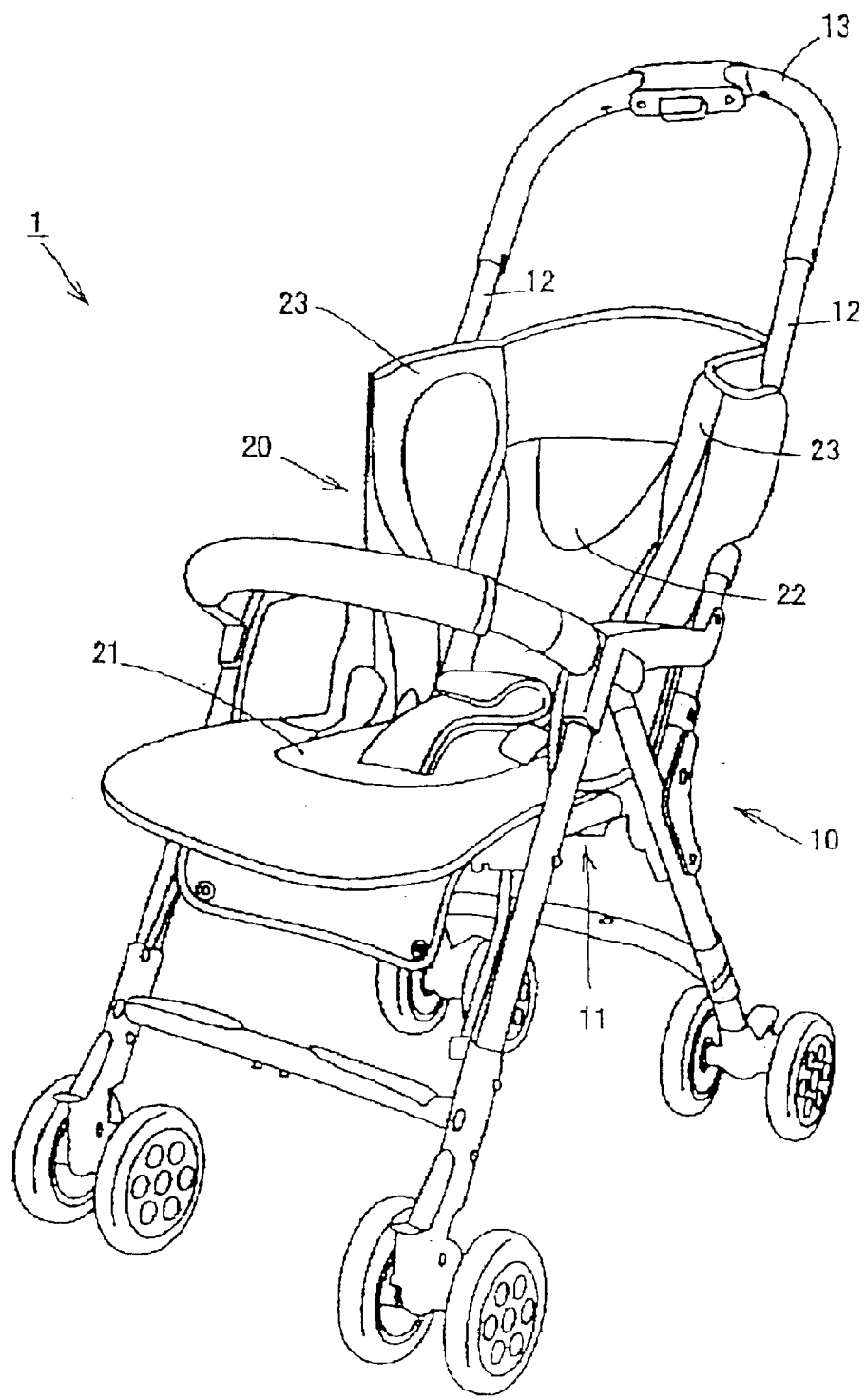
FIG. 1 is a perspective view showing a baby carriage as viewed from its front side according to an embodiment of the present invention.
Figure 2:
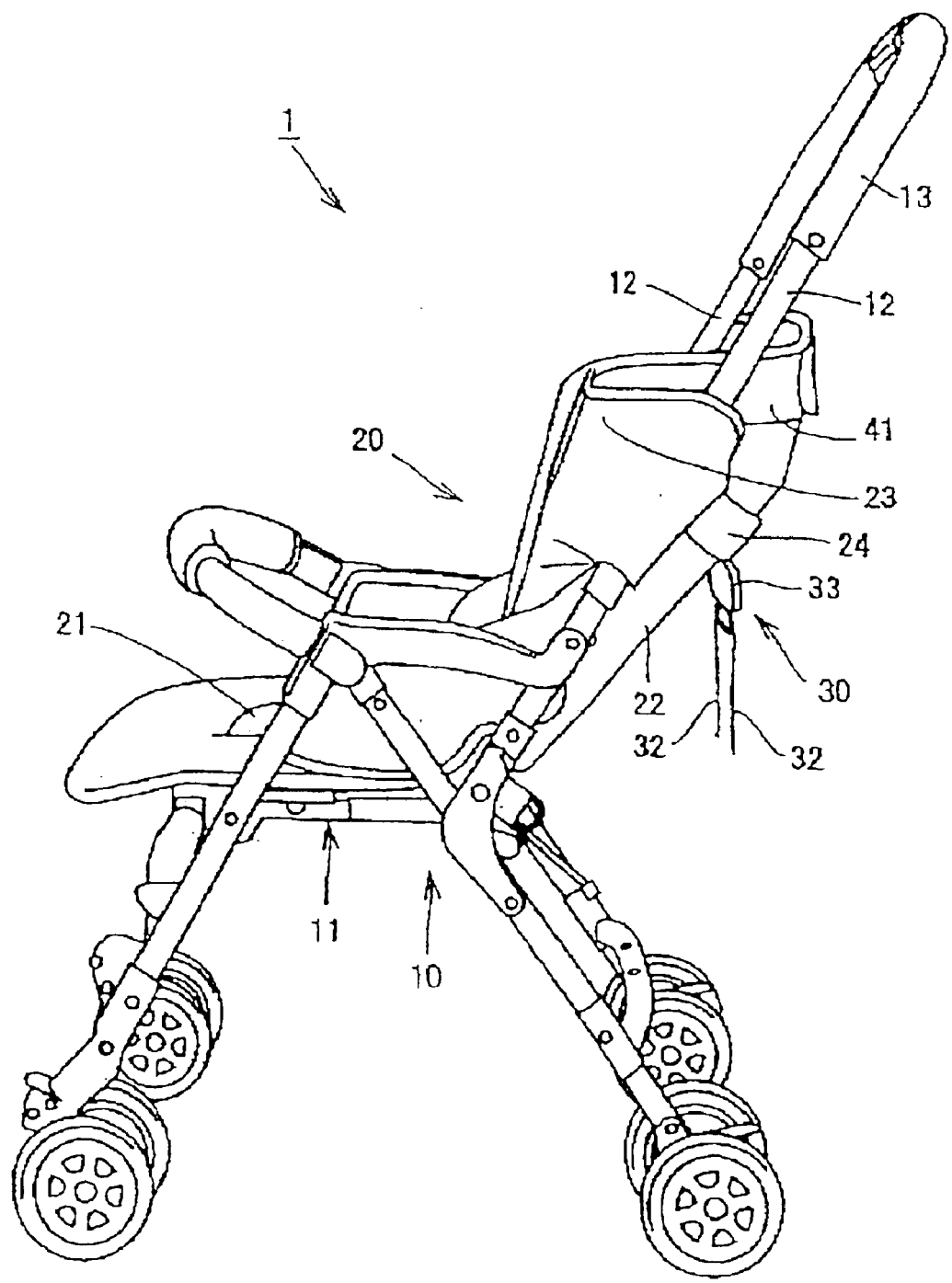
FIG. 2 is a side view showing the baby carriage.
Figure 3:
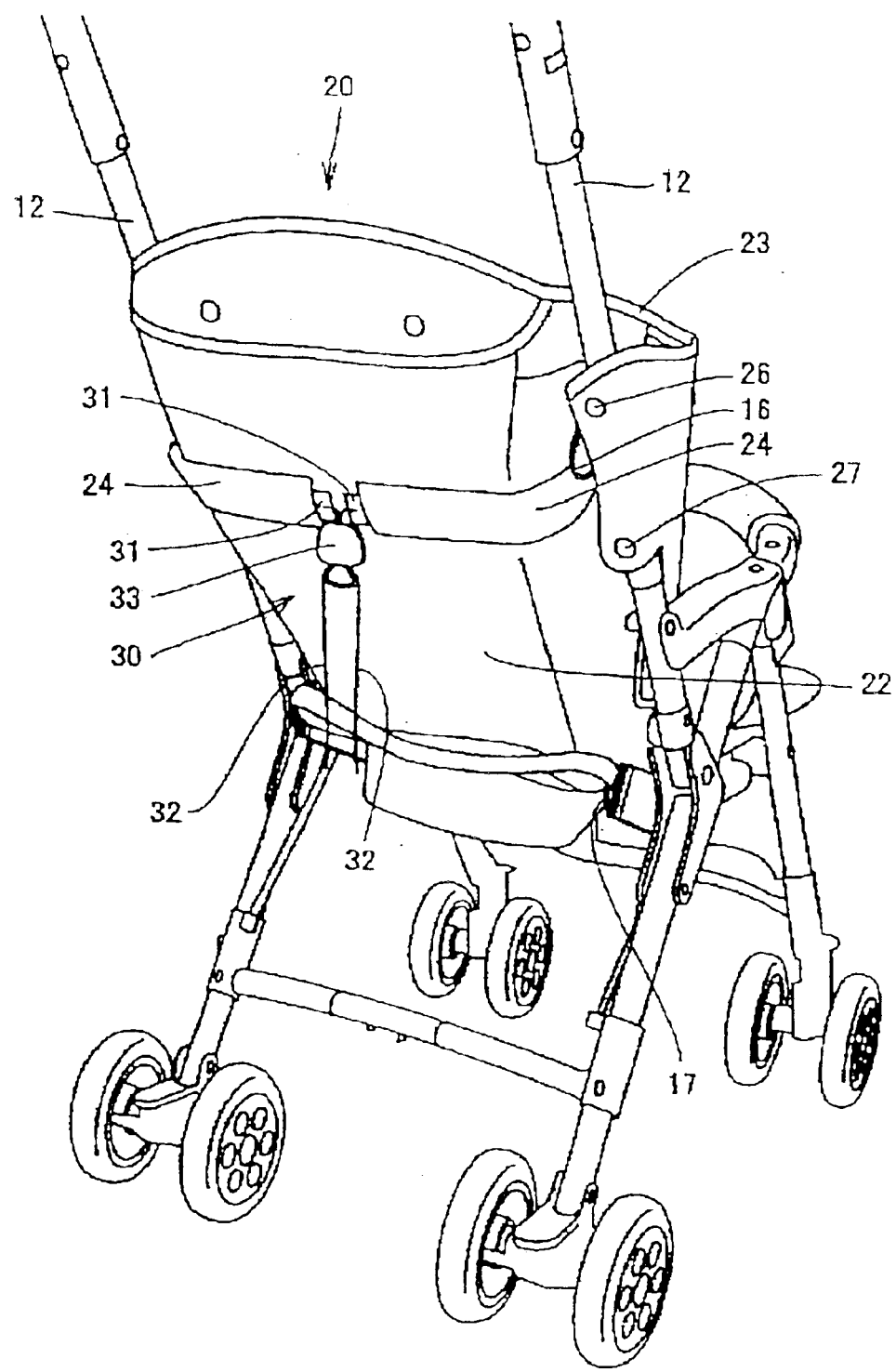
FIG. 3 is a perspective view showing the baby carriage as viewed from its rear side.
Figure 4:
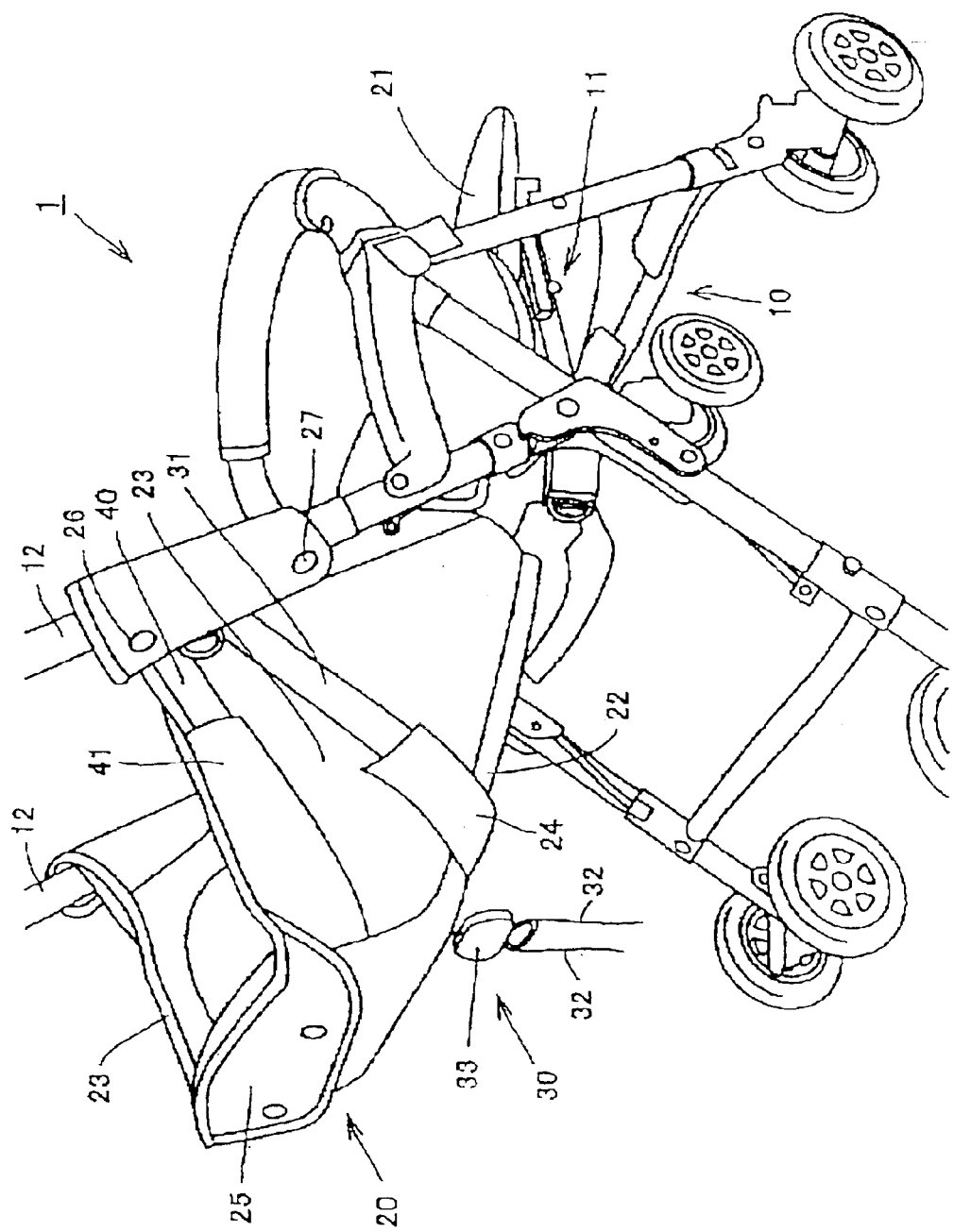
FIG. 4 is a perspective view showing the baby carriage in a form of a bed state provided by reclining a backrest seat portion.
Figure 5:
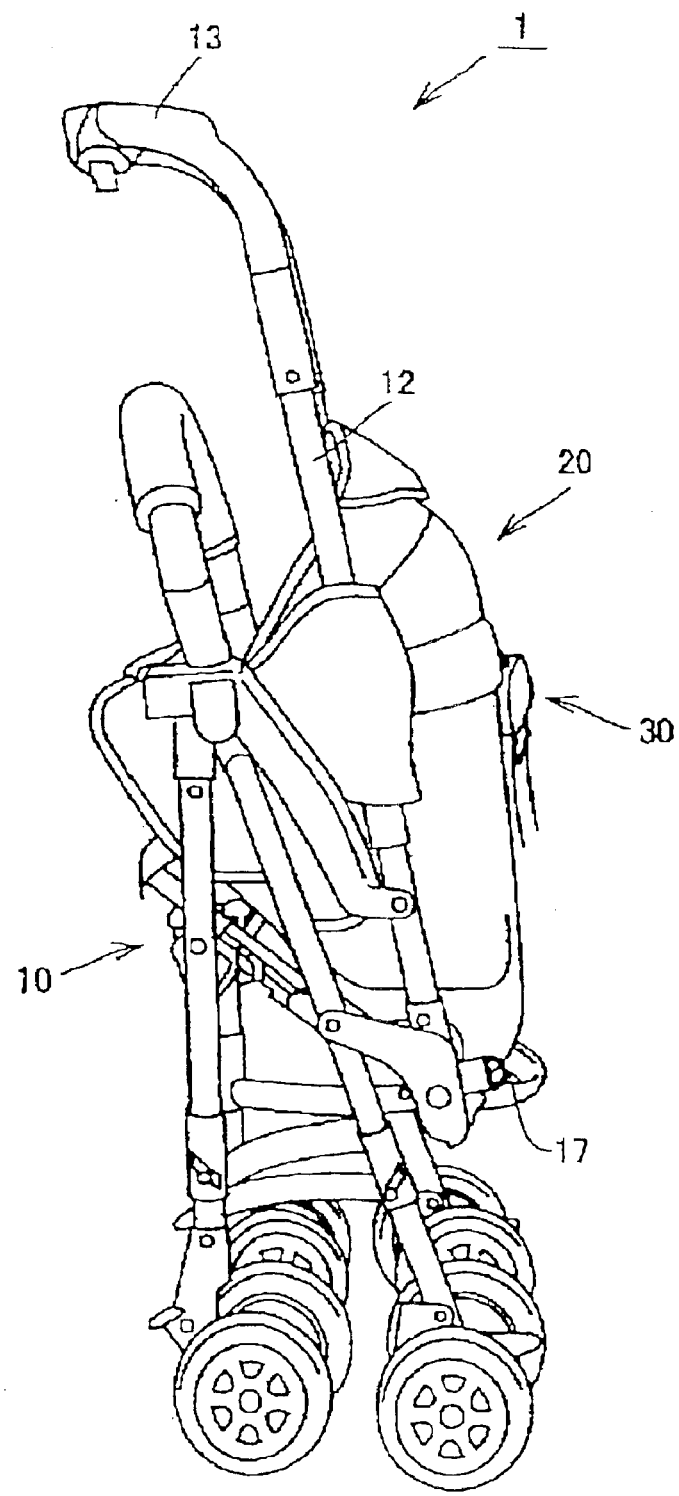
FIG. 5 is a side view showing the baby carriage in a folded state provided by narrowing in a width direction.

An illustrated baby carriage 1 can take a form of a chair state shown in FIGS. 1 through 3 and a form of a bed state shown in FIG. 4. In addition, as shown in FIG. 5, the baby carriage 1 stands by itself in a folded state by decreasing a dimension in its width direction. Since a structure for folding a baby carriage by decreasing its width direction is well known in the prior art, detailed illustration and description thereof will be omitted.

As shown in FIGS. 1 through 3, the baby carriage 1 comprises a body frame 10 constituting a carriage body, and a seat hammock 20 provided thereon. The body frame 10 includes a seating surface support member 11 supporting a seating surface and a pair of longitudinal side frame members 12 upwardly extending from both sides at rear end of the seating surface support member 11. Upper ends of the pair of longitudinal side frame members 12 are connected by an inverted U-shaped connecting member 13. A push rod for moving the baby carriage is constituted by the pair of longitudinal side frame members 12 and the inverted U-shaped connecting member 13.

The seat hammock 20 includes a seating surface sheet portion 21 extending on the seating surface support member 11 of the body frame, a backrest sheet portion 22 connected to the rear edge of the seating surface sheet portion 21 and extending between the pair of longitudinal side frame members 12, and a pair of side surface sheet portions 23 rising from both side edges of the backrest sheet portion 22 and frontwardly extending.

Figure 10:
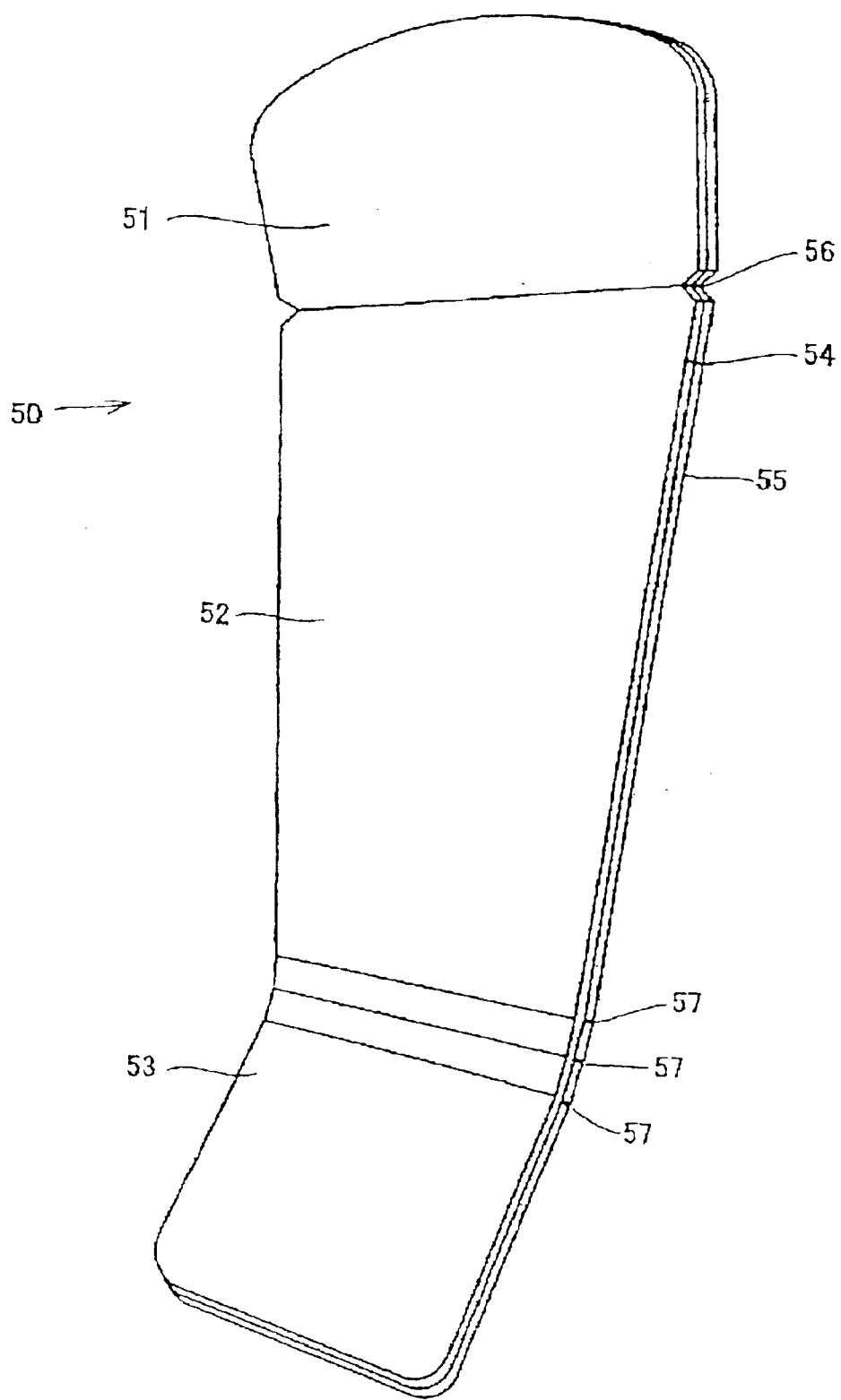
FIG. 10 is a perspective view showing a core material.

The backrest sheet portion 22 and the seating surface sheet portion 21 of the seat hammock 20 contains a sheet of contiguous flat plate-type core material 50 shown in FIG. 10. The core material 50 includes a hard resin plate 55 and a cushion material 54 attached thereon. The core material 50 is divided into three parts, that is, a head part core material 51, a back surface core material 52 and a seating surface core material 53.

Figure 11:
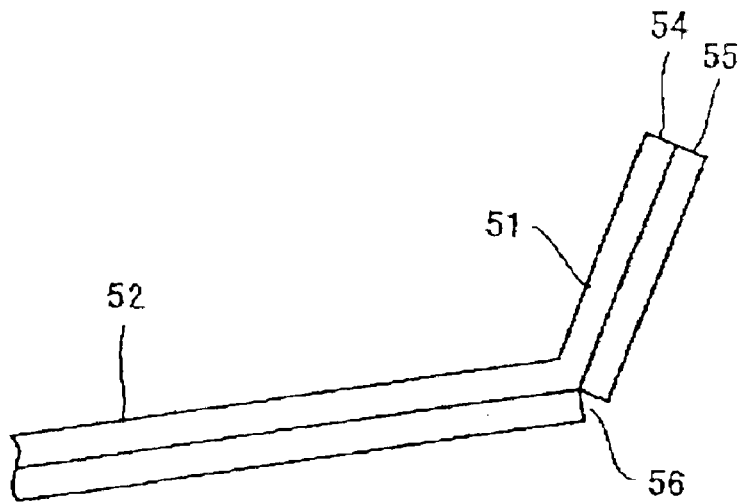
FIG. 11 is a side view showing a connecting part between a head part core material and a back surface core material.

As shown in FIG. 11, the head part core material 51 and the back surface core material 52 are connected so as to be able to be bent by virtue of a cut 56 provided in the resin plate 55 on the back side. A hinge for connecting them so as to be able to be bent is formed by a thin part of the resin plate 55, which was formed by cutting. In the state shown in FIG. 11, the head part core material 51 rises from the back surface core material 52. If the head part core material 51 is clockwise turned from this state so as to be on the same plane with the back surface core material 52, since the end face of the resin plate of the head part core material 51 abuts on the end face of the resin plate of the back surface core material 52, the state on the same plane for both parts can be stably maintained.

Figure 12:
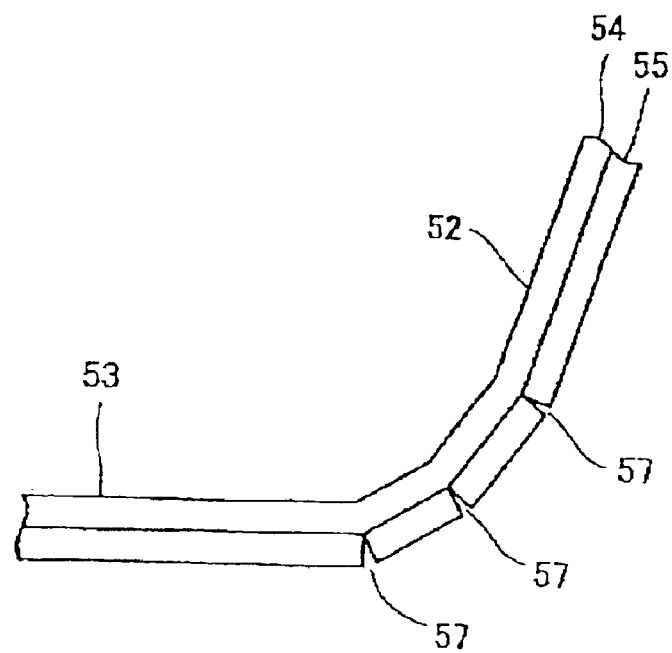
FIG. 12 is a side view showing a connecting part between the back surface core material and a seating surface core material.

As shown in FIG. 12, the back surface core material 52 and the seating surface core material 53 are connected so as to be able to be smoothly bent by virtue of three cuts 57 provided in the resin plate 55 on the back side. A hinge for connecting them so as to be able to be bent is formed by a thin part of the resin plate 55 formed by cutting. Since there are three cuts 57, the back surface core material 52 and the seating surface core material 53 are connected in a smoothly inflectional manner, thereby to stably support the hip of a baby in a large area.

As shown in FIG. 10, the back surface core material 52 and the head part core material 51 have a tapered shape which gradually becomes wider toward the upper portion. Preferably, the maximum width dimension part of the back surface core material 52 and the head part core material 51 ranges over the whole width dimension of the backrest seat portion 22.

As described above, since the back surface core material 52 and the head part core material 51 are made wide and the seating surface core material 53 and the back surface core material 52 are constituted by one sequential sheet of the core material, a posture of the backrest seat portion 22 can be stably maintained even in the illustrated lightweight-type baby carriage 1.

According to the conventional lightweight-type baby carriage which is folded by narrowing in the width direction, in order not to disturb its folding operation, the seating surface core material and the back surface core material are separated and the width dimensions of those core materials are narrowed. While a baby is seated in the carriage, since the baby is restrained by the crotch belt and the waist belt, movement of the seating surface sheet portion is restrained. Meanwhile, since the backrest sheet portion is connected to the seating surface sheet portion only by a cloth of a hammock and the width dimension of the back surface core member is narrow, the backrest sheet portion is laterally swayed by vibration accompanied by movement of the baby carriage.

Meanwhile, according to the illustrated baby carriage 1, since especially the back surface core member 52 and the seating surface core member 53 are formed of one contiguous sheet of core material, the lateral sway of the backrest sheet portion 22 can be minimized as much as possible. This effect is further improved by widening the width dimension of the back surface core material 52 such that the back surface core material 52 ranges over the whole length of the width dimension of the backrest sheet portion 22.

Figure 15:
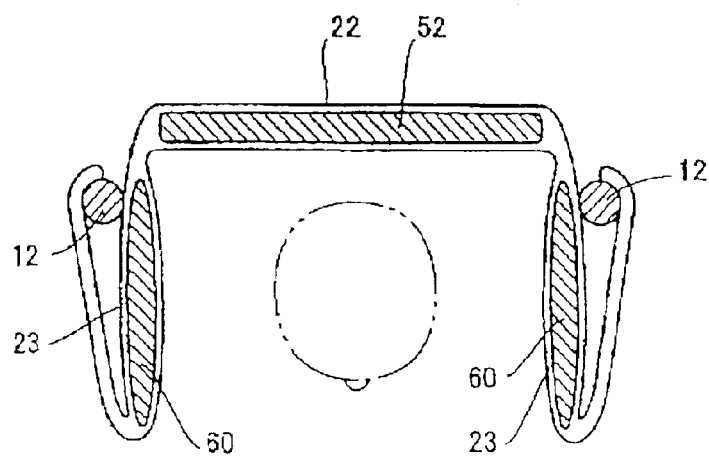
FIG. 15 is a sectional view showing a seat portion of the baby carriage in the chair state as viewed from the upper side.
Figure 16:
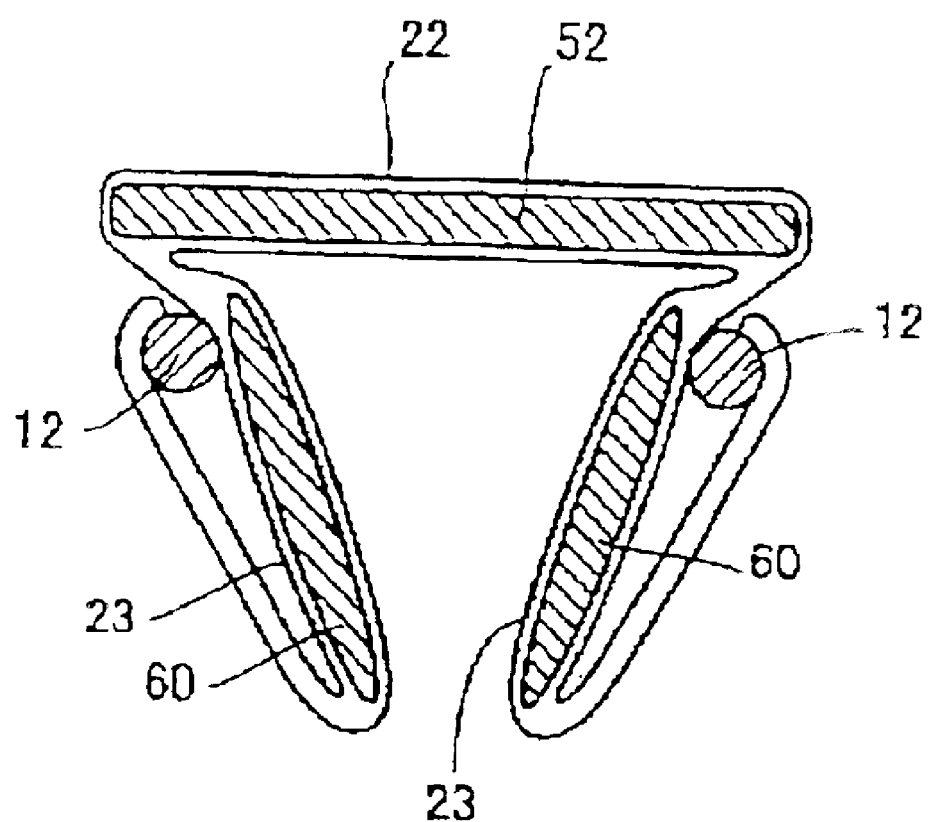
FIG. 16 is a sectional view showing the seat portion of the folded baby carriage as viewed from the upper side.

FIG. 15 shows a used state of the baby carriage 1 and FIG. 16 shows a folded state of the baby carriage 1. As can be seen by comparison between FIG. 15 and FIG. 16, in the folded state of the baby carriage, a distance between the pair of longitudinal side frame members 12 is narrowed. The back surface core material 52 occupies the whole length of the width dimension of the backrest sheet portion 22 in the used state shown in FIG. 15. In the folded state shown in FIG. 16, the backrest sheet portion 22 containing the back surface core material 52 is not bent in the width direction and positioned behind the pair of longitudinal side frame members 12. In such a folded structure, even if the width dimension of the back surface core material 52 is increased, that will not disturb the folding operation of the baby carriage which shrinks in the width direction.

As shown in FIG. 15, the pair of side surface sheet portions 23 includes protection pads 60 provided at positions corresponding to the height of the head of the baby seated in the baby carriage. In the form of the chair state shown in FIGS. 3 and 15, the pair of side surface sheet portions 23 containing the protection pads 60 frontwardly extends beyond the pair of longitudinal side frame members 12. Meanwhile, in the form of the bed state shown in FIG. 4, the side surface sheet portions 23 containing the protection pads are positioned behind the pair of longitudinal side frame members 12. Thus, according to the illustrated baby carriage 1, in both forms of chair state and bed state, the head of the baby can be protected from an impact from the side.

Then, description will be made of a mechanism for making the transition from the form of the chair state shown in FIGS. 1 through 3 to the form of the bed state shown in FIG. 4.

As can be clearly shown in FIG. 3, the baby carriage 1 includes a backside support 30 connected to the body frame 10 so as to support the backrest sheet portion 22 from the back side in such a manner that it can be reclined. The backside support 30 will be described in detail with reference to FIGS. 3, 13 and 14.

Figure 14:
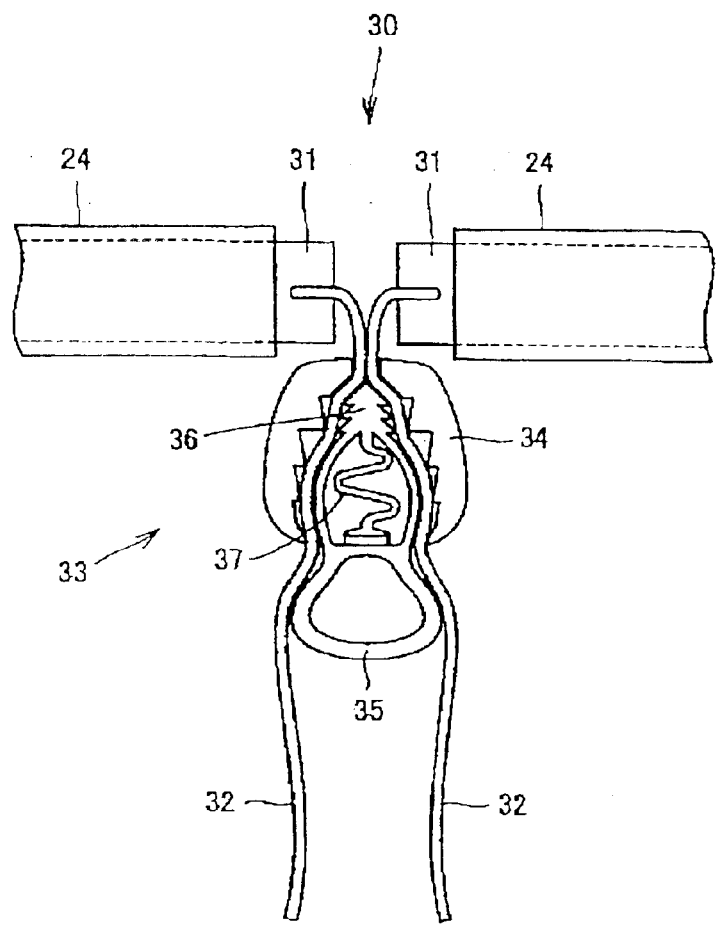
FIG. 14 illustrates a backside support, in which a lock member is shown in section.

The backside support 30 includes a backside string member extending along the whole length of the backrest sheet portion 22 on the back side in the width direction and having both ends connected to the pair of longitudinal side frame members 12. The backside string member is constituted by right and left belts 31, right and left strings 32 and a lock member 33 in the illustrated embodiment of the present invention. Each of the right and left belts 31 has one end connected to each of the pair of longitudinal side frame members 12. A pair of guide sleeves 24 for passing the right and left belts 31 through is sewn on the backside of the backrest sheet portion 22 of the hammock. As shown in FIG. 14, the other ends of the right and left belts 31 passed through the guide sleeves 24 are connected to the right and left strings 32, respectively.

The right and left strings 32 pass through the lock member 33. The lock member 33 includes a case 34, a finger grip 35 which are movable up and down, a click 36 positioned at the upper end of the finger grip 35, a spring 37 for forcing the finger grip 35 to move upward. When the backrest sheet portion 22 is loaded in the backward direction, although the right and left belts 31 are forced to separate from each other, the click 36 and the case 34 of the lock member 33 bite the right and left strings 32 to prevent the right and left strings from moving upward. Thus, the posture of the backrest sheet portion 22 can be stably maintained by the backside support 30.

When transition is made from the form of the chair state to the form of the bed state shown in FIG. 4, the finger grip 35 of the lock member 33 is only to be pinched by fingers and pulled down. When the finger grip 35 is pulled down, the click 36 is released from the right and left strings 32, whereby the backrest sheet portion 22 can be easily tumbled backward. When the backrest sheet portion 22 is brought in a position of a desired angle of inclination, the finger grip 35 is released from the finger. Then, the click 36 is forced by the spring 37 and bites the right and left strings 32 to fix the position of the backrest sheet portion 22.

As shown in FIG. 4, as the backrest sheet portion 22 is inclined backward until it becomes the form of the bed, an upper end region 25 of the backrest sheet portion 22 is inflected from the remaining backrest sheet portion and has a configuration to cover the top of a baby's head. This change in configuration can be attained by providing an upper end connecting member 40 for connecting the upper end of the backrest sheet portion 22 to the pair of longitudinal side frame members 12.

Figure 13:
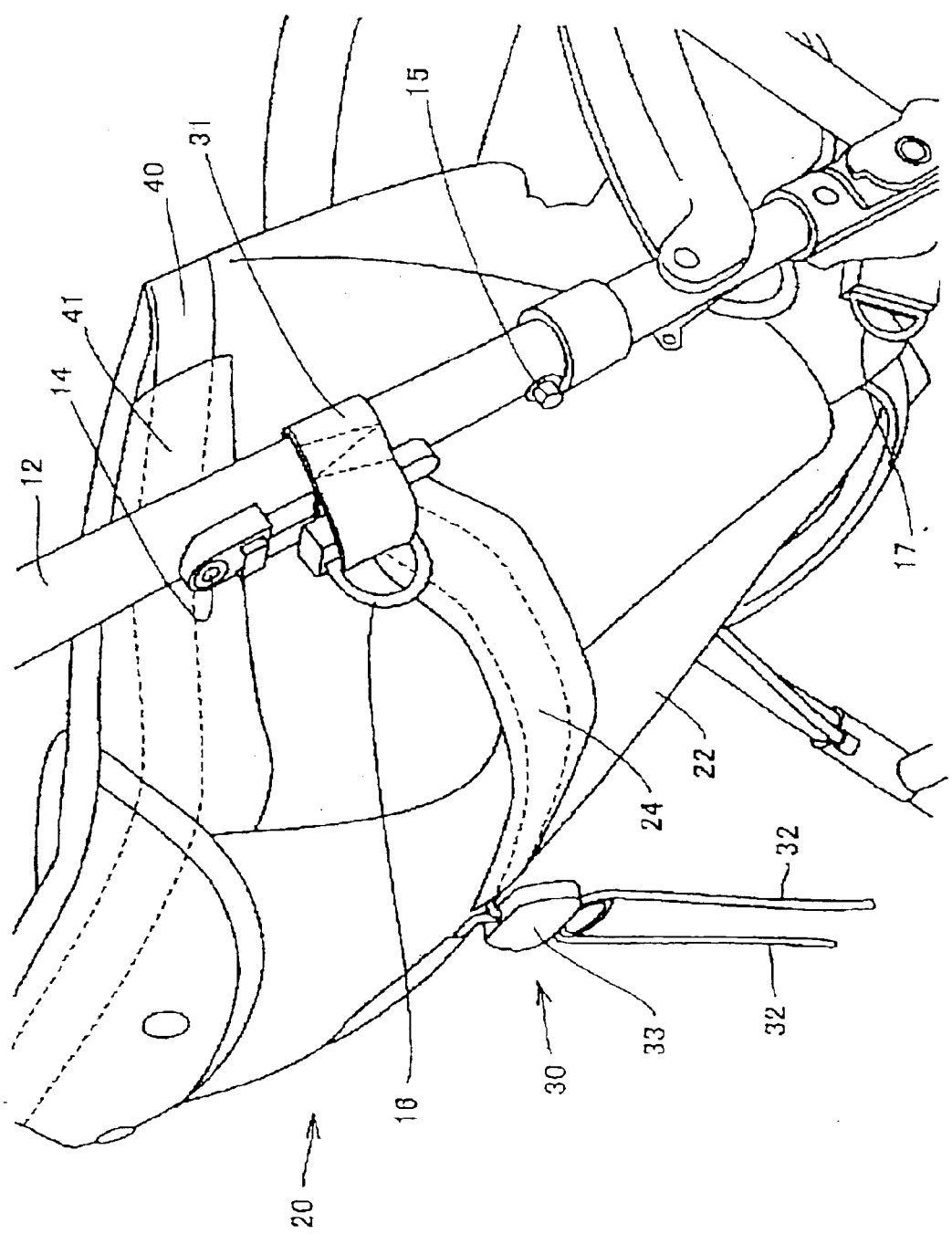
FIG. 13 is a perspective view showing a side and a backside of the baby carriage in detail.

As can be clear from FIGS. 4 and 13, the belt-shaped or string-shaped upper end connecting member 40 is provided at the upper end of the seat hammock 20. The upper end connecting member 40 passes through a guide sleeve 41 sewn on the upper end of the seat hammock 20. The pair of side surface sheet portions 23 of the seat hammock 20 is fixed in a state being winded around the pair of longitudinal side frame members 12. More specifically, a male button 26 and female button 27 mounted on the side surface sheet portion 23 are engaged with a female button 14 and male button 15 mounted on the longitudinal side frame member, respectively.

It is necessary to appropriately select the length of the upper end connecting member 40 so as to attain the following operations. In other words, the length of the upper end connecting member 40 is selected so as to raise the upper end of the backrest sheet portion 22 which is in a reclining state. According to the illustrated embodiment, as shown in FIG. 3, the upper end connecting member 40 is in an unloaded loose state until the reclined angle of the backrest sheet portion 22 reaches a predetermined value. Meanwhile, when the reclined angle of the backrest sheet portion 22 reaches the predetermined angle, the upper end connecting member 40 becomes in a tense state to fix the position of the upper end of the backrest sheet portion 22. Therefore, if the backrest sheet portion 22 is further reclined over the predetermined angle, the upper end region 25 of the backrest sheet portion 22 is inflected from the remaining backrest sheet portion and has the configuration to cover the top of the baby head as shown in FIG. 4.

The illustrated baby carriage 1 has a structure which provides facility for being carried in the folded state. The structure will be described with reference to FIGS. 6 through 9 and 13.

Figure 7:
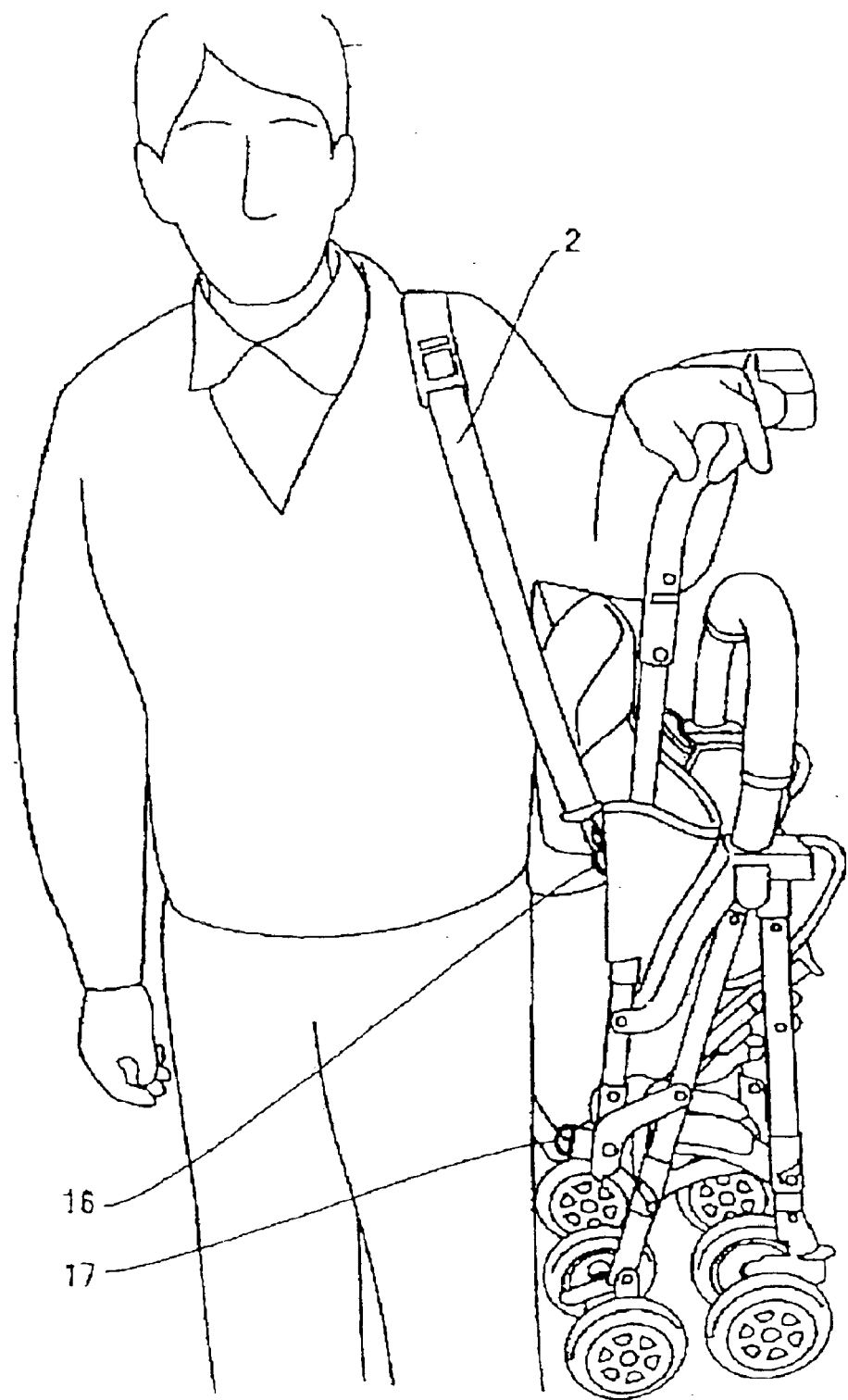
FIG. 7 illustrates a state when the folded baby carriage is held lengthwise.
Figure 9:
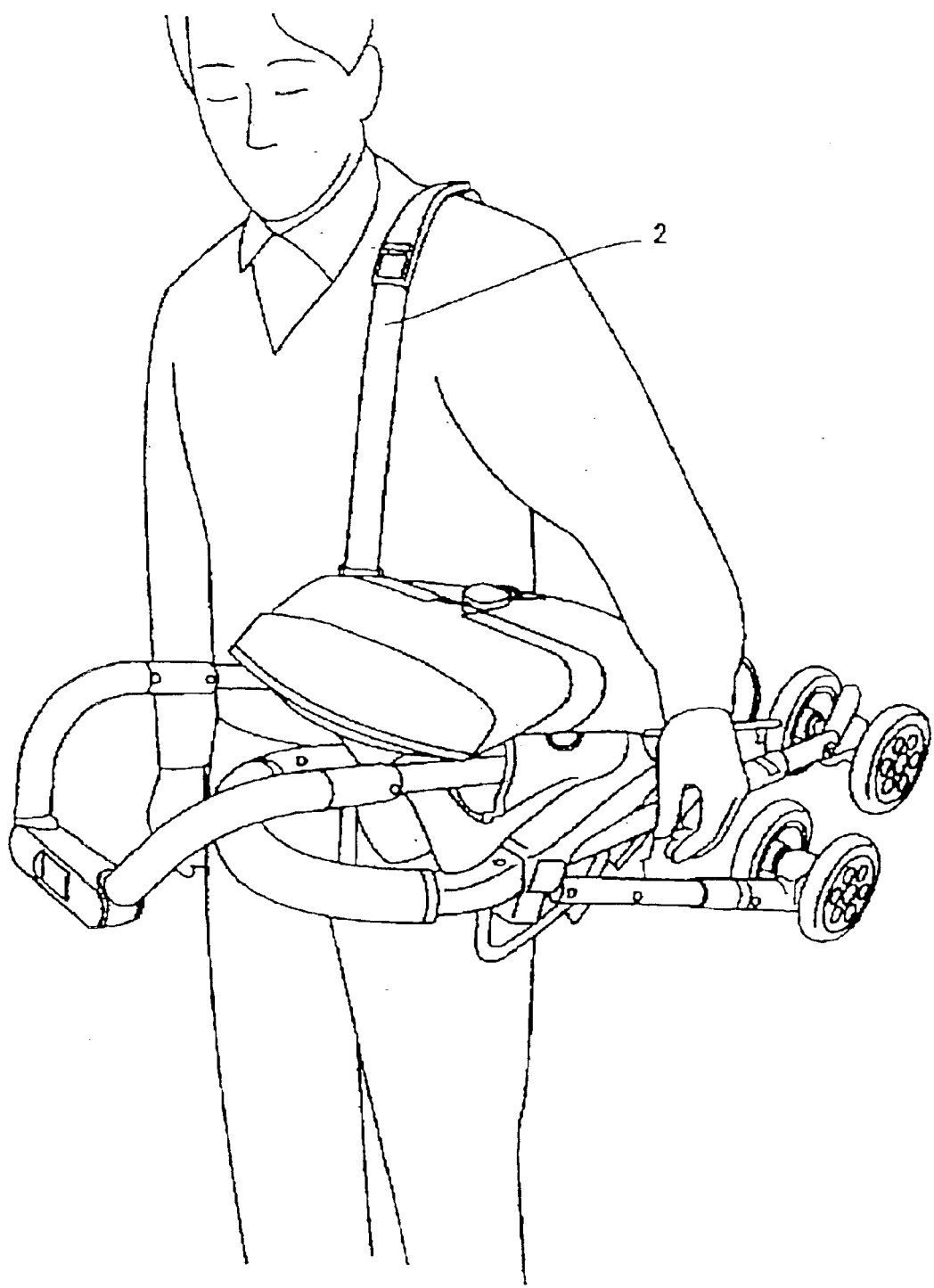
FIG. 9 illustrates a state when the folded baby carriage is held broadwise.

As shown in FIGS. 7 and 9, the baby carriage is easily carried when the baby carriage 1 in the folded state can be held on a shoulder by a suspended belt 2. In this case, it will be convenient if a state in which the baby carriage is held lengthwise as shown in FIG. 7 and a state in which the baby carriage is held broadwise as shown in FIG. 9 can be appropriately selected. Furthermore, it is convenient if the baby carriage can be carried on either shoulder.

In order to achieve the above, the baby carriage comprises the suspended belt 2 and four belt junction points for making junctions with the ends of the suspended belt 2. It is preferable that the belt junction points are provided at right and left positions in the upper region and at right and left positions in the lower region of the baby carriage in order to maintain weight balance across the center of gravity of the baby carriage in the folded state. In addition, although the suspended belt 2 may be joined at all times, the belt junction points are preferably provided on the backside of the baby carriage so as not to become a hindrance to the baby seated in the carriage.

Figure 6:
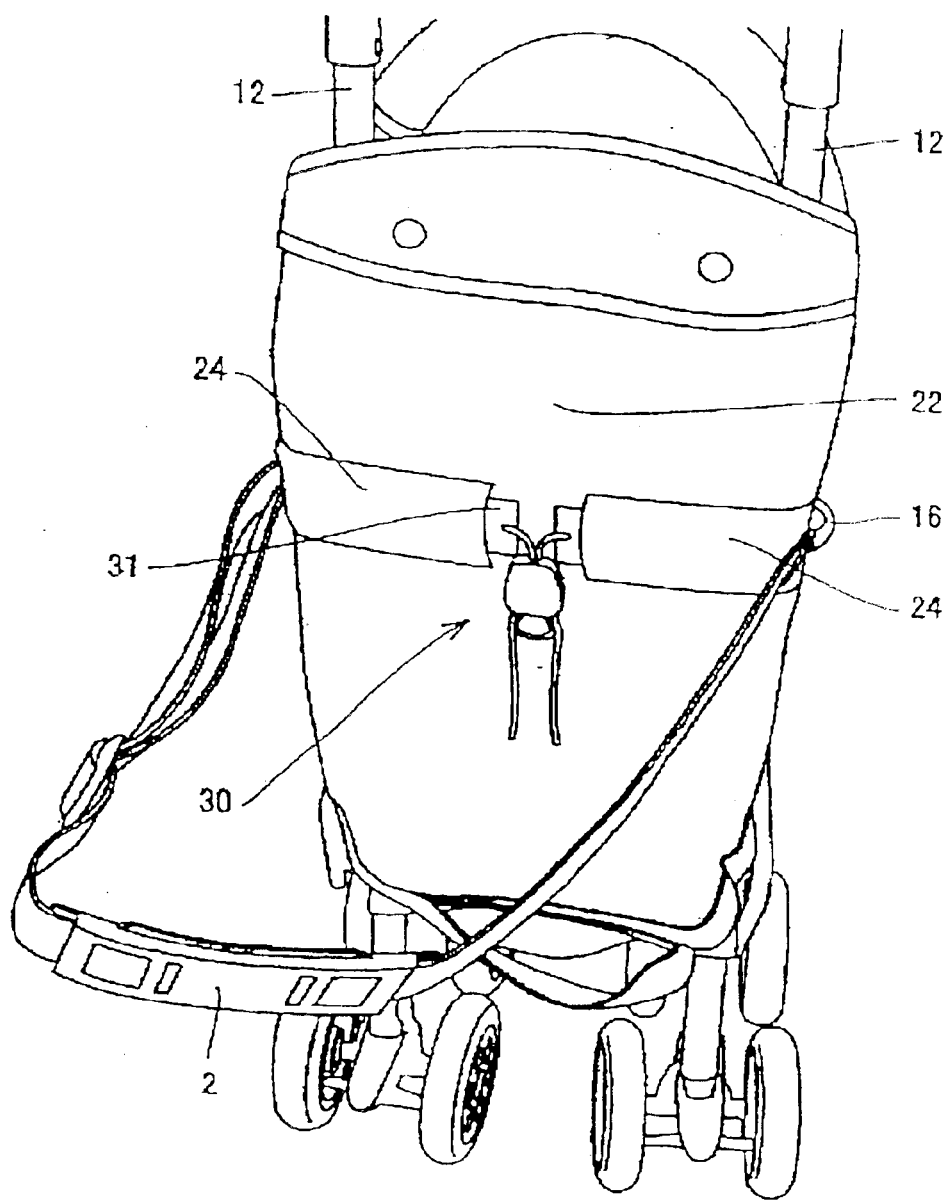
FIG. 6 illustrates such a state that both ends of a suspended belt are joined to upper belt junction points.

According to the illustrated embodiment of the present invention, as shown in FIGS. 6 and 13, as the upper belt junction points, snap rings 16 are attached to the pair of longitudinal side frame members 12. In the figures, although only the snap ring 16 on one side is shown, the same snap ring is attached at the same position on the other side. The suspended belt 2 has hooks having a well-known structure on its both ends. As shown in FIG. 6, if the suspended belt 2 is jointed to the upper two belt junction points, the baby carriage in the folded state can be held lengthwise as shown in FIG. 7.

Figure 8:
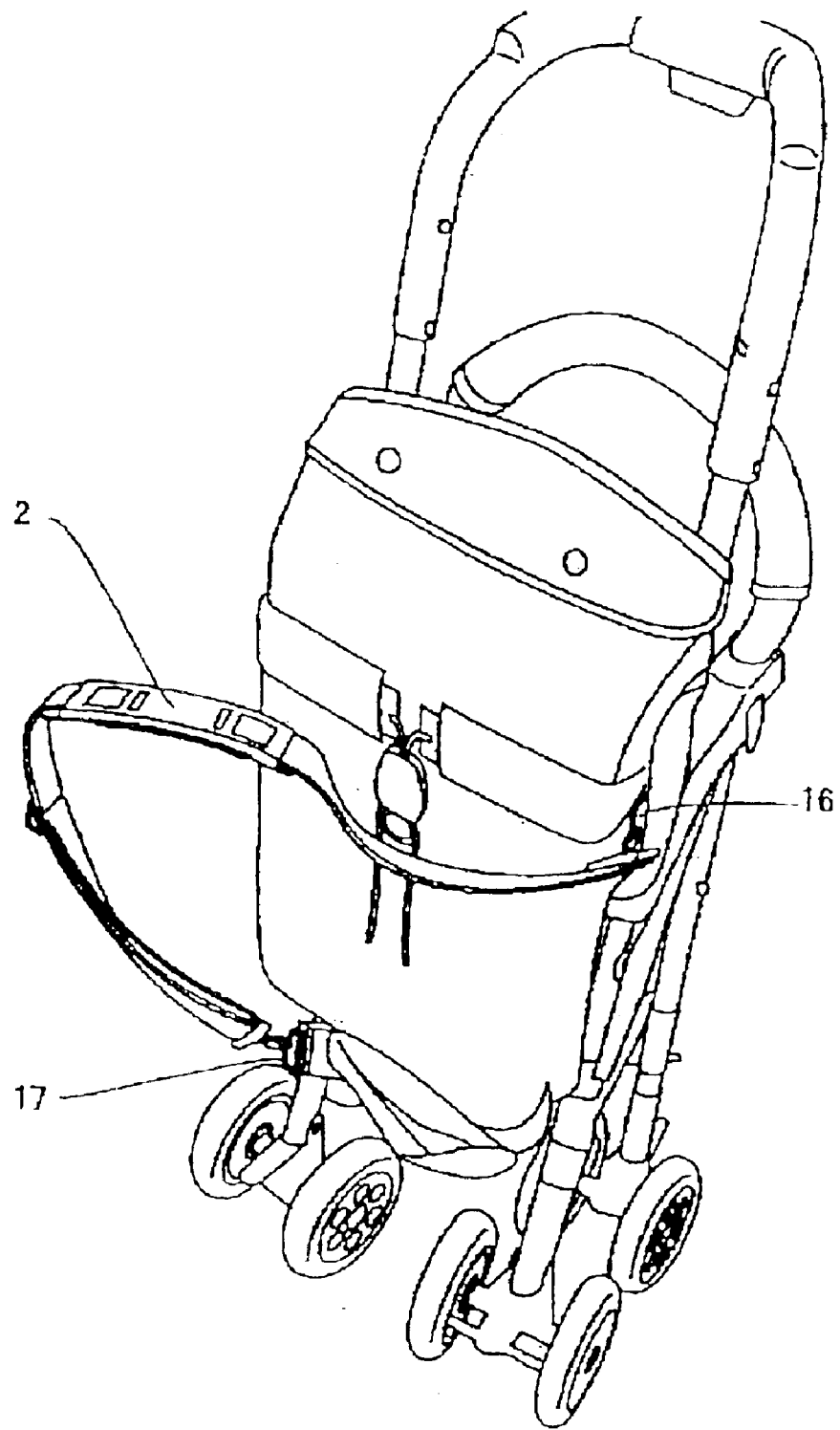
FIG. 8 illustrates such a state that one end of the suspended belt is joined to the upper belt junction point and the other end thereof is joined to a lower belt junction point.

As the lower belt junction points, according to the illustrated embodiment of the present invention, a snap ring 17 is attached to a rear end of the member for supporting the seating surface. The same snap ring 17 is provided on the other side (not shown). As shown in FIG. 8, if the suspended belt 2 is joined to the right upper snap ring 16 and the left lower snap ring 17, the baby carriage in the folded state can be held broadwise as shown in FIG. 9.

Although one embodiment of the present invention was described in detail in the above with reference to the drawings, they are illustrative and various modifications and changes are possible. Some of those will be enumerated and described hereinafter.

(1) Although the baby carriage was illustrated as a typical example of a child-care instrument, the present invention is applicable for a child-care instrument such as a child chair, a child car seat, a baby bed/chair. In short, the present invention is applicable for the child-care instrument in which a backrest portion of the seat can be reclined.

(2) According to the illustrated embodiment of the present invention, although the backside support comprises the backside string member extending along the whole length of the backrest sheet portion on the back side in the width direction and having both ends connected to the pair of longitudinal side frame members, the well-known reclining mechanism without the backside string member may be employed.

(3) According to the illustrated embodiment of the present invention, the upper end connecting member comprises the upper end string member extending along the whole length of the backrest seat portion at the upper end in the width direction and having both ends connected to the pair of longitudinal side frame members. However, it should be interpreted that the "string member" comprises not only the "string" provided apart from the seat hammock but also a reinforced upper edge of the seat hammock. In addition, the upper end connecting member is not limited only to the "string-shaped" member. For example, it may be a link member or the like which links the both sides of the backrest sheet portion at the upper region to the pair of longitudinal side frame members.

(4) According to the illustrated embodiment of the present invention, the backrest sheet portion can be reclined to be in the form of the bed. However, the present invention is applicable for the child-care instrument having a seat in which a backrest portion can be reclined, but it is not necessarily reclined until the backrest sheet portion is in the form of the bed.

What is claimed is:

1. A child-care instrument that can selectively be configured into a form of a bed state and a form of a chair state, said child-care instrument comprising:

a body frame including a seating surface support member and a pair of longitudinal side frame members upwardly extending from both sides at the rear end region of said seating surface support member;

a seat hammock including a seating surface sheet portion extending on said seating surface support member, a backrest sheet portion connected to a rear edge of said seating surface sheet portion and extending between said pair of longitudinal side frame members, a head part core material positioned at an upper end region of said backrest sheet portion, and a back surface core material flexibly connected to a lower end of said head part core material so as to be bendable relative thereto;

a backside support connected to said body frame so as to reclinably support said backrest sheet portion from a back side thereof; and an upper end connecting member connecting an upper end of said backrest sheet portion to said pair of longitudinal side frame members;

wherein:

said upper end connecting member extends entirely along a whole width of said backrest sheet portion at said upper end thereof and has two opposite ends respectively connected to said longitudinal side frame members, in said form of said chair state, said backrest sheet portion is at a relatively steeper first reclining angle and said upper end connecting member is in an unloaded loose state, and in said form of said bed state, said backrest sheet portion is in a relatively less steep second reclining angle that is less steep than said first reclining angle, and said upper end connecting member is in a tense state that causes said upper end region of said backrest sheet portion and said head part core material to bend at an angle and protrude upwardly from a remaining portion of said backrest sheet portion and said back surface core material.

2. The child-care instrument according to claim 1, wherein said upper end connecting member comprises an upper end string member having said two opposite ends thereof connected to said pair of longitudinal side frame members.

3. The child-care instrument according to claim 1, wherein said upper end connecting member is formed of a cloth material constituting said seat hammock.

4. The child-care instrument according to claim 1, wherein said upper end connecting member is formed of a reinforced upper edge of said seat hammock.

5. The child-care instrument according to claim 1, wherein said backside support comprises a backside string member extending entirely along said whole width of said backrest sheet portion on a back side thereof and having two opposite ends thereof respectively connected to said pair of longitudinal side frame members.

6. The child-care instrument according to claim 1, wherein said head part core material and said back surface core material are continuous portions of a sheet having a shape of a contiguous flat plate having cuts formed on a back side thereof serving as bending points between said materials.

7. The child-care instrument according to claim 1, wherein said seat hammock further comprises a pair of side surface sheet portions rising from two opposite side edges of said backrest sheet portion and frontwardly extending, and each of said pair of side surface sheet portions includes a protection pad at a position corresponding to a height of a child head when a child is seated in said child-care instrument.

8. The child-care instrument according to claim 7, wherein said child-care instrument is a baby carriage, said pair of side surface sheet portions frontwardly extend beyond said pair of longitudinal side frame members in said form of said chair state, and said pair of side surface sheet portions are positioned behind said pair of longitudinal side frame members in said form of said bed state.

9. A child-care instrument comprising:

a frame including a seat frame and two upright frame members extending upwardly and spaced apart from one another at a rear end of said seat frame;

a child-support hammock including a hammock seat that is connected to and supported by said seat frame, a hammock backrest that is connected to and extends longitudinally from a rear edge of said hammock seat and that extends widthwise, between said two upright frame members, and a hammock head cover that extends from a rear and upper edge of said hammock backrest;

a core plate including a head cover core that is arranged along said hammock head cover, and a backrest core that is arranged along said hammock backrest and that is flexibly connected to said head cover core along a flexible joint positioned along said rear and upper edge of said hammock backrest;

an adjustable backrest support that is connected to said upright frame members and extends between said upright frame members behind said hammock backrest and said backrest core, and that is adjustable to adjust a recline angle of said hammock backrest and said backrest core between a relatively steeper recline angle and a relatively less-steep recline angle; and a head cover adjusting member comprising a string, a strap, a belt, a fabric strip, a fabric reinforcement, or a link member that has opposite ends thereof connected to said upright frame members and extends between said upright frame members behind said hammock head cover and said head cover core, and that has such a length so said head cover adjusting member is in a loose unloaded state when said hammock backrest and said backrest core are positioned at said steeper recline angle and so said head cover adjusting member is in a tensioned state and pulls said hammock head cover and said head cover core to deflect upward from said hammock backrest and said backrest core about said flexible joint when said hammock backrest and said backrest core are positioned at said less-steep recline angle.

* * * * *

UNITED STATES PATENT AND TRADEMARK OFFICE
CERTIFICATE OF CORRECTION

PATENT NO. : 6,908,100 B2
DATED : June 21, 2005
INVENTOR(S) : Kassai et al.

It is certified that error appears in the above-identified patent and that said Letters Patent is hereby corrected as shown below:

<u>Title page,</u>
Item [56], References Cited, U.S. PATENT DOCUMENTS, add:
-- 6,471,222 B1 *     10/2002     Hsia     280/47.4 --;

<u>Column 1,</u>
Line 27, after "from", replace "failing" by -- falling --;

<u>Column 2,</u>
Line 59, after "contiguous", replace "fiat" by -- flat --.

Signed and Sealed this

Twenty-ninth Day of November, 2005

JON W. DUDAS
*Director of the United States Patent and Trademark Office*